US006540328B1

(12) United States Patent
Yashima et al.

(10) Patent No.: US 6,540,328 B1
(45) Date of Patent: *Apr. 1, 2003

(54) PRINTING APPARATUS AND PRINTING METHOD

(75) Inventors: Masataka Yashima, Tokyo (JP); Katsumi Aoki, Yokohama (JP); Tsuyoshi Shibata, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/361,802

(22) Filed: Jul. 27, 1999

(30) Foreign Application Priority Data

Jul. 30, 1998 (JP) .......................... 10-216022

(51) Int. Cl.$^7$ ................................. B41J 2/21
(52) U.S. Cl. ............... 347/43; 347/14; 347/15
(58) Field of Search ................... 347/43, 41, 40, 347/5, 15, 100, 14; 358/530

(56) References Cited

U.S. PATENT DOCUMENTS

| | | | | |
|---|---|---|---|---|
| 4,313,124 A | | 1/1982 | Hara ........................... 347/57 |
| 4,345,262 A | | 8/1982 | Shirato et al. ................ 347/10 |
| 4,459,600 A | | 7/1984 | Sato et al. .................... 344/47 |
| 4,463,359 A | | 7/1984 | Ayata et al. ................... 347/56 |
| 4,558,333 A | | 12/1985 | Sugitani et al. ............... 347/65 |
| 4,635,078 A | * | 1/1987 | Sakurada et al. ............. 347/43 |
| 4,723,129 A | | 2/1988 | Endo et al. .................... 347/56 |
| 4,740,796 A | | 4/1988 | Endo et al. .................... 347/56 |
| 5,371,531 A | * | 12/1994 | Rezanka et al. .............. 347/43 |
| 5,568,169 A | * | 10/1996 | Dudek et al. ................. 347/43 |
| 5,596,355 A | | 1/1997 | Koyama et al. .............. 347/43 |
| 5,615,312 A | | 3/1997 | Kohler ........................ 395/109 |
| 5,659,407 A | * | 8/1997 | Andersen et al. ............ 358/530 |
| 5,721,628 A | | 2/1998 | Takaragi et al. ............. 358/518 |
| 5,900,891 A | * | 5/1999 | Shimoda ....................... 347/43 |
| 6,059,404 A | * | 5/2000 | Jaeger et al. ................. 347/43 |
| 6,062,674 A | * | 5/2000 | Inui et al. .................... 347/43 |

FOREIGN PATENT DOCUMENTS

| | | |
|---|---|---|
| EP | 0 730 970 | 9/1996 |
| JP | 54-56847 | 5/1979 |
| JP | 54-59936 | 5/1979 |
| JP | 59-123670 | 7/1984 |
| JP | 59-128461 | 8/1984 |
| JP | 59-138461 | 8/1984 |
| JP | 60-71260 | 4/1985 |
| JP | 1-168454 | 7/1989 |
| JP | 2-210962 | 8/1990 |
| JP | 7-95416 | 4/1995 |
| JP | 9-323435 | 12/1997 |
| WO | 96/32288 | 10/1996 |

OTHER PUBLICATIONS

"An Adaptive Algorithm For Spatial Grey Scale", by Robert Floyd et al. SID 75 Digest, pp. 36–37. Jul. 1974.

* cited by examiner

*Primary Examiner*—Lamson Nguyen
(74) *Attorney, Agent, or Firm*—Fitzpatrick, Cella, Harper & Scinto

(57) ABSTRACT

A printing apparatus and a printing method define an achromatic region and a chromatic region of image data. The image data is defined as an achromatic region when a difference between a maximum and a minimum values among R, G, B values corresponds to 1% to 10% of a range of values that R, G, B values are obtainable. In the achromatic region, the number of black and its derivative ink dots to be ejected per one pixel is 4 dots at the maximum. A chromatic region is defined as an area where does not satisfy the requirements of the achromatic region. In the chromatic region, the number of black and its derivative ink dots to be ejected per one pixel is 1 dots at the maximum.

24 Claims, 10 Drawing Sheets

CMY TABLE

| x | C1 | C2 | DYE CONTENT | DOT NUMBER | REFLECTION DENSITY | DENSITY LEVEL dl[x] | th[x] |
|---|---|---|---|---|---|---|---|
| 0 | 2 | 0 | 7.00 | 2 | 2.51 | 0 | |
| 1 | 1 | 0 | 3.50 | 1 | 1.88 | 66 | 33 |
| 2 | 0 | 2 | 1.80 | 2 | 0.90 | 164 | 115 |
| 3 | 0 | 1 | 0.90 | 1 | 0.51 | 204 | 184 |
| 4 | 0 | 0 | 0.00 | 0 | 0.00 | 255 | 229 |

| x | M1 | M2 | DYE CONTENT | DOT NUMBER | REFLECTION DENSITY | DENSITY LEVEL dl[x] | th[x] |
|---|---|---|---|---|---|---|---|
| 0 | 2 | 0 | 7.00 | 2 | 2.38 | 0 | |
| 1 | 1 | 0 | 3.50 | 1 | 1.58 | 86 | 43 |
| 2 | 0 | 2 | 1.80 | 2 | 0.86 | 163 | 124 |
| 3 | 0 | 1 | 0.90 | 1 | 0.49 | 203 | 183 |
| 4 | 0 | 0 | 0.00 | 0 | 0.00 | 255 | 229 |

| x | Y | | DYE CONTENT | DOT NUMBER | REFLECTION DENSITY | DENSITY LEVEL dl[x] | th[x] |
|---|---|---|---|---|---|---|---|
| 0 | 2 | | 5.00 | 2 | 2.38 | 0 | |
| 1 | 1 | | 2.50 | 1 | 1.75 | 68 | 34 |
| 2 | 0 | | 0.00 | 0 | 0.00 | 255 | 161 |

CMY TABLE

| x | C1 | C2 | DYE CONTENT | DOT NUMBER | REFLECTION DENSITY | DENSITY LEVEL dl[x] | th[x] |
|---|----|----|-------------|------------|--------------------|--------------------|-------|
| 0 | 2  | 0  | 7.00        | 2          | 2.51               | 0                  |       |
| 1 | 1  | 0  | 3.50        | 1          | 1.88               | 66                 | 33    |
| 2 | 0  | 2  | 1.80        | 2          | 0.90               | 164                | 115   |
| 3 | 0  | 1  | 0.90        | 1          | 0.51               | 204                | 184   |
| 4 | 0  | 0  | 0.00        | 0          | 0.00               | 255                | 229   |

| x | M1 | M2 | DYE CONTENT | DOT NUMBER | REFLECTION DENSITY | DENSITY LEVEL dl[x] | th[x] |
|---|----|----|-------------|------------|--------------------|--------------------|-------|
| 0 | 2  | 0  | 7.00        | 2          | 2.38               | 0                  |       |
| 1 | 1  | 0  | 3.50        | 1          | 1.58               | 86                 | 43    |
| 2 | 0  | 2  | 1.80        | 2          | 0.86               | 163                | 124   |
| 3 | 0  | 1  | 0.90        | 1          | 0.49               | 203                | 183   |
| 4 | 0  | 0  | 0.00        | 0          | 0.00               | 255                | 229   |

| x | Y  | DYE CONTENT | DOT NUMBER | REFLECTION DENSITY | DENSITY LEVEL dl[x] | th[x] |
|---|----|-------------|------------|--------------------|--------------------|-------|
| 0 | 2  | 5.00        | 2          | 2.38               | 0                  |       |
| 1 | 1  | 2.50        | 1          | 1.75               | 68                 | 34    |
| 2 | 0  | 0.00        | 0          | 0.00               | 255                | 161   |

FIG. 2

K TABLE AT ACHROMATIC REGION

| X | K1 | K2 | K3 | K4 | K5 | K6 | DYE CONTENT | DOT NUMBER | REFLECTION DENSITY | dl[x] | th[x] |
|---|----|----|----|----|----|----|-------------|------------|--------------------|-------|-------|
| 0 | 3 | 0 | 0 | 0 | 0 | 0 | 14.40 | 3 | 2.53 | 0 | |
| 1 | 1 | 1 | 2 | 0 | 0 | 0 | 9.60 | 4 | 2.39 | 14 | 7 |
| 2 | 1 | 1 | 1 | 0 | 0 | 1 | 8.55 | 4 | 2.30 | 23 | 18 |
| 3 | 1 | 1 | 0 | 1 | 0 | 0 | 7.80 | 3 | 2.22 | 32 | 27 |
| 4 | 1 | 1 | 0 | 0 | 0 | 1 | 7.35 | 3 | 2.16 | 38 | 35 |
| 5 | 1 | 0 | 1 | 1 | 1 | 0 | 6.90 | 4 | 2.09 | 44 | 41 |
| 6 | 1 | 0 | 1 | 0 | 1 | 1 | 6.45 | 4 | 2.01 | 52 | 48 |
| 7 | 0 | 2 | 1 | 0 | 0 | 0 | 6.00 | 3 | 1.93 | 60 | 56 |
| 8 | 0 | 2 | 0 | 1 | 1 | 0 | 5.70 | 4 | 1.87 | 66 | 63 |
| 9 | 0 | 1 | 2 | 1 | 0 | 0 | 5.40 | 4 | 1.81 | 73 | 70 |
| 10 | 0 | 1 | 2 | 0 | 1 | 0 | 5.10 | 4 | 1.74 | 80 | 76 |
| 11 | 0 | 1 | 1 | 2 | 0 | 0 | 4.80 | 4 | 1.67 | 87 | 83 |
| 12 | 0 | 1 | 1 | 1 | 1 | 0 | 4.50 | 4 | 1.60 | 94 | 90 |
| 13 | 0 | 1 | 1 | 1 | 0 | 1 | 4.35 | 4 | 1.56 | 98 | 96 |
| 14 | 0 | 1 | 1 | 1 | 0 | 0 | 4.20 | 3 | 1.52 | 102 | 100 |
| 15 | 0 | 1 | 1 | 0 | 1 | 1 | 4.05 | 4 | 1.48 | 106 | 104 |
| 16 | 0 | 1 | 1 | 0 | 1 | 0 | 3.90 | 3 | 1.43 | 110 | 108 |
| 17 | 0 | 1 | 1 | 0 | 0 | 1 | 3.75 | 3 | 1.39 | 115 | 113 |
| 18 | 0 | 1 | 0 | 1 | 2 | 0 | 3.60 | 4 | 1.35 | 119 | 117 |
| 19 | 0 | 1 | 0 | 1 | 1 | 1 | 3.45 | 4 | 1.30 | 124 | 121 |
| 20 | 0 | 1 | 0 | 1 | 1 | 0 | 3.30 | 3 | 1.26 | 128 | 126 |
| 21 | 0 | 0 | 2 | 1 | 0 | 1 | 3.15 | 4 | 1.21 | 133 | 131 |
| 22 | 0 | 0 | 2 | 1 | 0 | 0 | 3.00 | 3 | 1.16 | 138 | 135 |
| 23 | 0 | 0 | 2 | 0 | 1 | 1 | 2.85 | 4 | 1.12 | 143 | 140 |
| 24 | 0 | 0 | 1 | 2 | 1 | 0 | 2.70 | 4 | 1.07 | 148 | 145 |
| 25 | 0 | 0 | 1 | 2 | 0 | 1 | 2.55 | 4 | 1.02 | 153 | 150 |
| 26 | 0 | 0 | 1 | 1 | 2 | 0 | 2.40 | 4 | 0.96 | 158 | 155 |
| 27 | 0 | 0 | 1 | 1 | 1 | 1 | 2.25 | 4 | 0.91 | 163 | 161 |
| 28 | 0 | 0 | 1 | 1 | 1 | 0 | 2.10 | 3 | 0.86 | 169 | 166 |
| 29 | 0 | 0 | 1 | 1 | 0 | 1 | 1.95 | 3 | 0.80 | 174 | 171 |
| 30 | 0 | 0 | 1 | 1 | 0 | 0 | 1.80 | 2 | 0.75 | 180 | 177 |
| 31 | 0 | 0 | 1 | 0 | 1 | 1 | 1.65 | 3 | 0.69 | 185 | 183 |
| 32 | 0 | 0 | 0 | 2 | 0 | 2 | 1.50 | 4 | 0.63 | 191 | 188 |
| 33 | 0 | 0 | 0 | 1 | 2 | 1 | 1.35 | 4 | 0.57 | 197 | 194 |
| 34 | 0 | 0 | 0 | 1 | 1 | 2 | 1.20 | 4 | 0.51 | 203 | 200 |
| 35 | 0 | 0 | 0 | 1 | 1 | 1 | 1.05 | 3 | 0.45 | 209 | 206 |
| 36 | 0 | 0 | 0 | 1 | 1 | 0 | 0.90 | 2 | 0.39 | 216 | 212 |
| 37 | 0 | 0 | 0 | 1 | 0 | 1 | 0.75 | 2 | 0.33 | 222 | 219 |
| 38 | 0 | 0 | 0 | 0 | 1 | 2 | 0.60 | 3 | 0.27 | 228 | 225 |
| 39 | 0 | 0 | 0 | 0 | 1 | 1 | 0.45 | 2 | 0.20 | 235 | 232 |
| 40 | 0 | 0 | 0 | 0 | 0 | 2 | 0.30 | 2 | 0.13 | 241 | 238 |
| 41 | 0 | 0 | 0 | 0 | 0 | 1 | 0.15 | 1 | 0.07 | 248 | 245 |
| 42 | 0 | 0 | 0 | 0 | 0 | 0 | 0.00 | 0 | 0.00 | 255 | 252 |

FIG. 3

K TABLE AT CHROMATIC REGION

| X | K1 | K2 | K3 | K4 | K5 | K6 | DYE CONTENT | DOT NUMBER | REFLECTION DENSITY | d1[a] | th[a] |
|---|----|----|----|----|----|----|-------------|------------|--------------------|-------|-------|
| 0 | 3 | 0 | 0 | 0 | 0 | 0 | 14.40 | 3 | 2.53 | 0 | |
| 1 | 2 | 0 | 0 | 0 | 0 | 0 | 9.60 | 2 | 2.39 | 14 | 7 |
| 2 | 1 | 0 | 0 | 0 | 0 | 0 | 4.80 | 1 | 1.67 | 87 | 50 |
| 3 | 0 | 1 | 0 | 0 | 0 | 0 | 2.40 | 1 | 0.96 | 158 | 122 |
| 4 | 0 | 0 | 1 | 0 | 0 | 0 | 1.20 | 1 | 0.51 | 203 | 181 |
| 5 | 0 | 0 | 0 | 1 | 0 | 0 | 0.60 | 1 | 0.27 | 228 | 216 |
| 6 | 0 | 0 | 0 | 0 | 1 | 0 | 0.30 | 1 | 0.13 | 241 | 235 |
| 7 | 0 | 0 | 0 | 0 | 0 | 1 | 0.15 | 1 | 0.07 | 248 | 245 |
| 8 | 0 | 0 | 0 | 0 | 0 | 0 | 0.00 | 0 | 0.00 | 255 | 252 |

FIG. 4

CMY TABLE

| x | C1 | DYE CONTENT | DOT NUMBER | REFLECTION DENSITY | DENSITY LEVEL d1 [x] | th [x] |
|---|---|---|---|---|---|---|
| 0 | 2 | 5.00 | 2 | 2.42 | 0 | |
| 1 | 1 | 2.50 | 1 | 1.80 | 65 | 33 |
| 2 | 0 | 0.00 | 0 | 0.00 | 255 | 160 |
| x | M1 | DYE CONTENT | DOT NUMBER | REFLECTION DENSITY | DENSITY LEVEL d1 [x] | th [x] |
| 0 | 2 | 5.00 | 2 | 2.31 | 0 | |
| 1 | 1 | 2.50 | 1 | 1.55 | 84 | 42 |
| 2 | 0 | 0.00 | 0 | 0.00 | 255 | 169 |
| x | Y | DYE CONTENT | DOT NUMBER | REFLECTION DENSITY | DENSITY LEVEL d1 [x] | th [x] |
| 0 | 2 | 3.60 | 2 | 2.33 | 0 | |
| 1 | 1 | 1.80 | 1 | 1.71 | 68 | 34 |
| 2 | 0 | 0.00 | 0 | 0.00 | 255 | 161 |

FIG. 7

K TABLE AT ACHROMATIC REGION

| x | K1 | K2 | K3 | DYE CONTENT | DOT NUMBER | REFLECTION DENSITY | DENSITY LEVEL dl [x] | th [x] |
|---|----|----|----|-------------|------------|--------------------|-----------------------|--------|
| 0 | 3 | 0 | 0 | 9.60 | 3 | 2.52 | 0 | |
| 1 | 2 | 1 | 0 | 7.60 | 3 | 2.46 | 6 | 3 |
| 2 | 2 | 0 | 1 | 6.80 | 3 | 2.40 | 12 | 9 |
| 3 | 2 | 0 | 0 | 6.40 | 2 | 2.36 | 16 | 14 |
| 4 | 1 | 2 | 0 | 5.60 | 3 | 2.24 | 28 | 22 |
| 5 | 1 | 1 | 1 | 4.80 | 3 | 2.08 | 44 | 36 |
| 6 | 1 | 1 | 0 | 4.40 | 2 | 1.98 | 54 | 49 |
| 7 | 1 | 0 | 2 | 4.00 | 3 | 1.87 | 65 | 60 |
| 8 | 1 | 0 | 1 | 3.60 | 2 | 1.75 | 78 | 72 |
| 9 | 1 | 0 | 0 | 3.20 | 1 | 1.61 | 92 | 85 |
| 10 | 0 | 2 | 1 | 2.80 | 3 | 1.46 | 107 | 99 |
| 11 | 0 | 2 | 0 | 2.40 | 2 | 1.30 | 124 | 115 |
| 12 | 0 | 1 | 2 | 2.00 | 3 | 1.12 | 142 | 133 |
| 13 | 0 | 1 | 1 | 1.60 | 2 | 0.92 | 162 | 152 |
| 14 | 0 | 1 | 0 | 1.20 | 1 | 0.71 | 183 | 172 |
| 15 | 0 | 0 | 2 | 0.80 | 2 | 0.49 | 205 | 194 |
| 16 | 0 | 0 | 1 | 0.40 | 1 | 0.25 | 229 | 217 |
| 17 | 0 | 0 | 0 | 0.00 | 0 | 0.00 | 255 | 242 |

FIG. 8

K TABLE AT CHROMATIC REGION

| x | K1 | K2 | K3 | DYE CONTENT | DOT NUMBER | REFLECTION DENSITY | DENSITY LEVEL dl [x] | th [x] |
|---|----|----|----|-------------|------------|--------------------|-----------------------|--------|
| 0 | 3 | 0 | 0 | 9.60 | 3 | 2.52 | 0 | |
| 1 | 2 | 0 | 0 | 6.40 | 2 | 2.36 | 16 | 8 |
| 2 | 1 | 0 | 0 | 3.20 | 1 | 1.61 | 92 | 54 |
| 3 | 0 | 1 | 0 | 1.20 | 1 | 0.71 | 183 | 137 |
| 4 | 0 | 0 | 1 | 0.40 | 1 | 0.25 | 229 | 206 |
| 5 | 0 | 0 | 0 | 0.00 | 0 | 0.00 | 255 | 242 |

FIG. 9

PRINTING APPARATUS AND PRINTING METHOD

This application is based on Patent Application No. 10-216022 (1998) filed Jul. 30, 1998 in Japan, the content of which is incorporated hereinto by reference.

BACKGROUND OF THE INVENTION

1. Field of the Invention

The present invention relates to a printing apparatus and a printing method for printing an image on a printing medium by ink dots, which are formed as a result of discharging ink. More particularly, the present invention relates to a printing apparatus and a printing method for printing a color image by using more than one inks in different concentrations for black.

2. Description of the Prior Art

In recent years, copying machines, information-processing apparatuses (e.g., word processor and computer), and communication apparatuses become widely available. As one of their image-forming and printing means, an apparatus using an inkjet printing head for printing an image in digital form has been sprung into wide use. In addition, the above information-processing apparatuses and communication apparatuses become possible to provide high-quality and colored visual information. Therefore, the request of a printing apparatus with the capability of providing a high-quality color image has been increased.

For the sake of providing a high-quality color image, it is well-known that a printing apparatus is configured so as to use a printing head which is prepared by accumulating and arranging a plurality of printing elements to correspond to minute pixels (hereinafter, referred as a multi-head). In an inkjet printing system, for example, it is well-known that a printing head having high-density orifices for ejecting ink and high-density liquid passages is used. For a color image printing, a plurality of multi-heads may be included so as to correspond to cyan, magenta, yellow, and black inks, respectively.

However, the present technology has a certain limit to accumulate orifices and liquid passages in high density, so that there is also a certain limit to make a minute pixel. In this case, each dot that forms the corresponding pixel becomes one in a certain size that depends on such a limitation, resulting in troubles of image qualities. Such troubles include granularity in a lower dense portion such as a high-light portion of an image.

Instead of increasing the accumulation densities of orifices and liquid passages (i.e., instead of decreasing the size of one pixel), the so-called multi-drop method is well known in the art. The method lessens the discharged volume of ink by decreasing a diameter of each orifice or the like and forms a dot by discharging several ink droplets on the same pixel in accordance with an image to be printed. The method allows a comparatively small diameter of a dot to be printed on a printing medium, so that the granularity on the lower dense portion such as a high-light portion of an image can be improved. If the ink droplet to be discharged is too small, there is a tendency of causing unstable ink discharge. Thus, there is a certain limitation of decreasing the size of an ink droplet. As a result, there is also a certain limitation of increasing an image quality. In this method, furthermore, the number of ink droplets to be discharged on one pixel increases as the concentration increases. Thus, a printing operation takes much time and results in drop in a printing speed. Consequently, a high-quality image formation and an increase in printing speed are mutually contradictory.

A gray-scale printing method is known as another technique of forming a high-quality image without increasing the accumulation density of orifices. The gray-scale printing method uses different concentrated inks of the same color. In this method, a high-light portion or the like is printed using a comparatively low concentrated ink (hereinafter, referred as a light ink) so that the granularity does not attract attention, while high-concentrated portion is printed using a comparatively high concentrated ink (hereinafter, referred as a dark ink). Unlike the multi-drop system, therefore, it becomes possible to print the high-concentrated portion without increasing the number of ink droplets to be discharged on one pixel (i.e., the number of ink discharges). Consequently, the gray-scale printing method is able to avoid a decrease in printing speed.

The above method using light and dark inks may be improperly applied to some cases, such as medical images, especially a monochrome image such as an X-ray image. The medical image is printed on a transparent printing medium such as a transparent film. Even though such a medical image is provided as a monochrome one, it requires a comparatively precise gradation. It is noted that an absolute volume of light passing through an image on a transparent printing medium is greater than an absolute volume of light reflecting from an image on a reflective one. Accordingly, a visually recognizable dynamic range of the transparent image is more extended than that of the reflective image, so that the number of recognizable gray-scale levels of the former is greater than that of the latter. Therefore, a visual resolution with respect to an ink concentration is increased. As the difference in concentration of each pixel is also recognized in a case where light and dark inks are used, the image may be recognized as a rough one. For improving this fact, there is an idea of increasing the number of gray-scale levels for each pixel. However, the above method requires increasing numbers of different types of light and dark inks with their corresponding multi-heads, resulting in the high cost.

The present inventors and their colleagues make a suggestion concerning another method in Japanese Patent Application No.9-323435 (1997). The method includes the step of printing different concentrated inks of the same color (especially different concentrated black inks) on the same pixel. In this case, for example, four drops of such inks are printed one by one on the same pixel to provide gray-scale levels more than the number of levels per one pixel in the prior method. It means that more gray-scale levels can be represented without substantially increasing the number of light and dark inks and the number of multi-heads.

The above printing procedure uses a pseudo-halftones processing method by means of a binary or multi-level processing, such as a dither method, an error diffusion method, and a mean concentration maintenance method.

The dither method is of representing each pixel data in a binary form that depends on a threshold level of each pixel determined by a dither matrix.

The error diffusion method represents an image data of a target pixel in a binary form (converting into the darkest level or the lightest level and distributes a difference (i.e., an error) between the binary level and the pre-binary level on the peripheral pixels to perform an addition of levels. See, for example, R. FLOYD & STEINBERG, "AN ADAPTIVE ALGORITHM FOR SPETIAL GRAY SCALE", SID 75 DIGEST pp. 36–37.

The mean concentration maintenance method is described in Japanese Patent Application Laying-open No. 2-210962

(1990) and so on. In this method, a binary form depending on a threshold level represents the target data. The threshold level is determined by using binary data of a neighborhood of the target pixel which is previously represented in a binary form or using binary data obtained by representing the target pixel by one of two levels, black or white.

In addition, a multi-level processing may be allowed by revising various kinds of binary methods.

In the case of the above method for overlaying different concentrated inks, there are following problems.

A printing medium has a threshold volume of ink to be accepted. If the volume of ink to be discharged on the same pixel exceeds such a threshold, excess ink cannot be absorbed into the printing medium and results in "ink overflow". In this case, furthermore, a printing medium may be wrinkled (i.e., "cockling") by an effect of the absorbed ink.

Take, for example, an output of a medical image such as a color echogram. It requires both a gradation of black and an output in multiple colors, if light and dark inks of black are discharged at almost the acceptable volume of ink absorption, there are no remaining abilities to absorb additional inks of cyan, magenta, yellow. Thus, the problems described above may be caused when those inks are further discharged on the same pixel.

For placing emphasis on an output in multiple colors, there is another problem in which a sufficient gradation of black cannot be attained. The reason is that a degree of freedom for overlaying light and dark inks of black and its derived colors is limited to allow a sufficient absorption of any of cyan, magenta, and yellow color inks.

SUMMARY OF THE INVENTION

It is an object of the present invention is to provide a printing apparatus and a printing method that avoid any problems including an ink overflow to allow a color image formation with a sufficient gradation of black.

In the first aspect of the present invention, there is provided a printing apparatus that forms an image with use of a plurality type of black ink having different concentrations and other color inks, comprising:

region-determining means for determining whether a color represented by image data belongs to an achromatic region or a chromatic region on the basis of the image data; and gray-scale combination means for determining one of the type of ink and a volume of ink to be applied to one pixel on the basis of the image data for each region determined by the region-determining means.

In the second aspect of the present invention, there is provided a printing method using a printing apparatus that forms an image with use of a plurality type of black ink having different concentrations and other color inks, comprising the steps of:

region-determination for determining whether a color that represented by image data belongs to an achromatic region or a chromatic region on the basis of the image data; and gray-scale combination for determining one of the type of ink and a volume of ink to be applied to one pixel on the basis of the image data for each region determined by the region-determination step.

The above and other objects, effects, features and advantages of the present invention will become more apparent from the following description of embodiments thereof taken in conjunction with the accompanying drawings.

BRIEF DESCRIPTION OF THE DRAWINGS

FIG. 2 is a table that represents combinations of different concentrated inks of cyan (C), magenta (M), and yellow (Y) in the first embodiment of the present invention;

FIG. 3 is a table that represents combinations of different concentrated inks of black (K) in an achromatic region in the first embodiment of the present invention;

FIG. 4 is a table that represents combinations of different concentrated inks of black (K) in a chromatic region in the first embodiment of the present invention;

FIG. 7 is a table that represents combinations of different concentrated inks of cyan (C), magenta (M), and yellow (Y) in the third embodiment of the present invention;

FIG. 8 is a table that represents combinations of different concentrated inks of black (K) in an achromatic region in the third embodiment of the present invention;

FIG. 9 is a table that represents combinations of different concentrated inks of black (K) in a chromatic region in the third embodiment of the present invention.

DESCRIPTION OF THE PREFERRED EMBODIMENTS

Figure 1:
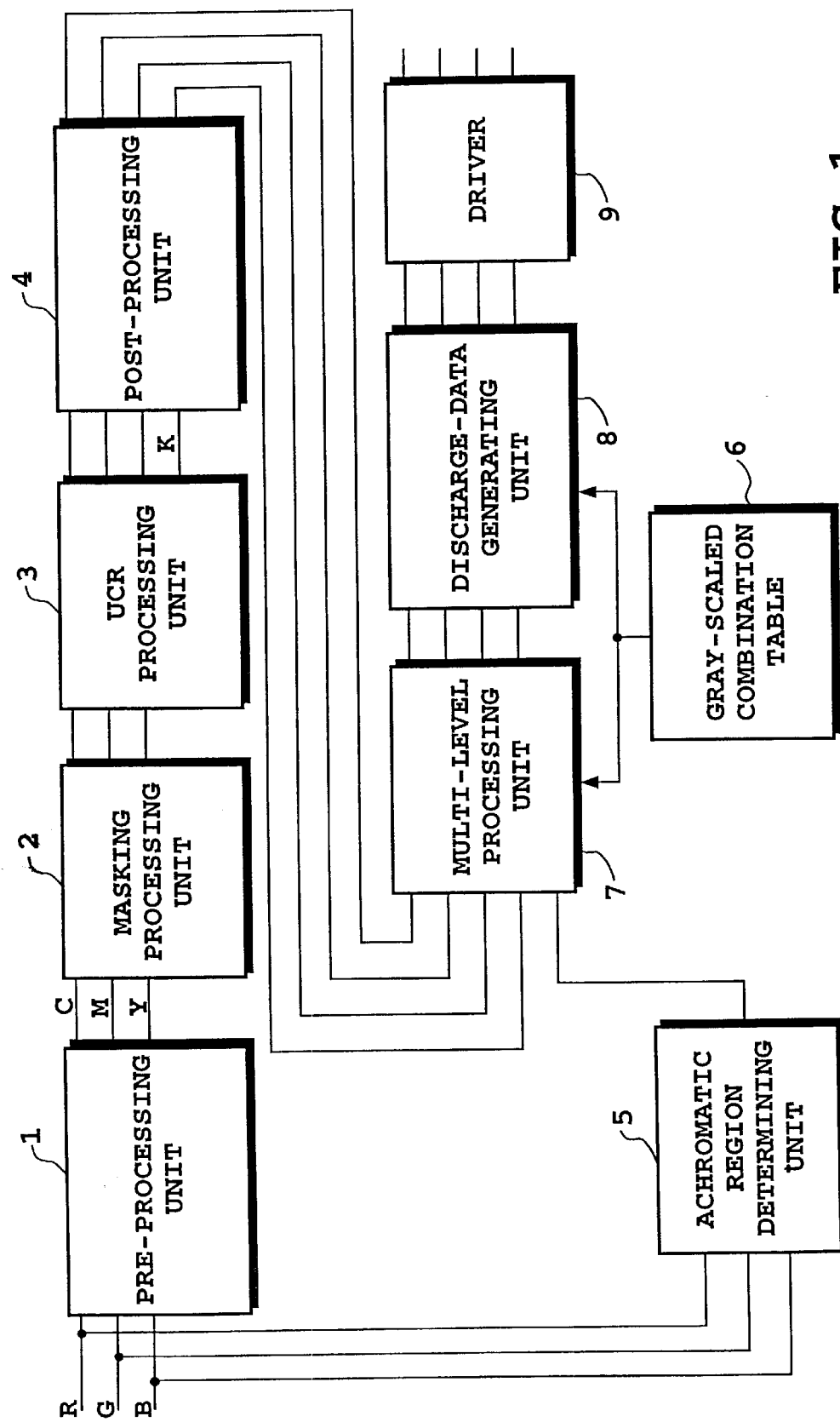
FIG. 1 is a block diagram of an image processing procedure in a first embodiment of the present invention.

Hereinafter, preferred embodiments of a printing apparatus and a printing method in accordance with the present invention will be described in detail with reference to the attached drawings.

A printing apparatus as one of the preferred embodiments of the present invention includes a plurality of light and dark inks for black (k) (i.e., black inks having different concentrations to each other, hereinafter, these inks are simply referred to as black ink). In addition, it includes other inks for colors of cyan (C), magenta (M), yellow (Y), and so on to be required for color printing.

As described above, there is the acceptable limit of the amount of ink to be applied on a printing medium. It means that there is the acceptable limit of the number of ink droplets to be discharged on one pixel which is the smallest element of an image.

Hence the relationship between the acceptable limits of the number of ink droplets and the amount of ink to be absorbed in an area corresponding to one pixel can be expressed by the following expression.

$$V \alpha r^2 \qquad (1)$$

wherein "V" denotes the volume of an ink droplet to be discharged and "r" denotes a diameter of a dot formed by such an ink droplet. If a diameter of a dot at the time of forming an image corresponds to "R", a printing density at this time (i.e., a length of each side of one pixel) can be principally expressed by the following equation.

$$x = 2^{1/2} \times r \qquad (2)$$

A volume ("W") of ink to be absorbed in an area of one pixel may be proportional to a thickness ("d") of an ink-receiving layer. Thus, we can express as follows.

$$W \alpha x^2 \times d \quad (3)$$

Therefore, a threshold value "t" of the number of ink droplets which can be discharged for one pixel is expressed by the following equation.

$$t = W/V\alpha 2d \quad (4)$$

If the relationship between the dot's diameter and the printing density is held so as to be expressed by the equation (2), the threshold value "t" of the number of ink droplets is equal to a constant value without depending on the printing density or the like. It means that the threshold value "t" of the number of ink droplets depends on the characteristics of printing medium and ink. In general, the threshold value "t" takes about 3 to 4 per one pixel, especially about 4 to 6 per one pixel.

In the present embodiment, therefore, the printing apparatus performs an image formation on condition that the threshold value "t" is in the above range. However, the present invention is not limited in the above range because the threshold value "t" varies with reference to the characteristics of printing medium and ink.

Next, we will describe a combination of light and dark inks to be discharged for expressing a gray-scale image. Also, the number of multi-levels will be described in detail.

If "n" different types of light and dark inks are used, the number of the combinations of different inks to be discharged (i.e., the combinations of light and dark inks) can be varied as follows.

If one type is selected from "n" different types of light and dark inks to form one pixel by one dot, the number of combinations can be expressed by "$_nC_1 = n$" wherein "n" denotes a positive integer.

If two types are selected from "n" different types of light and dark inks to form one pixel by two dots, the number of combinations can be expressed by "$_nC_2 = n(n-1)/2$".

If one pixel is formed by three dots, the number of combinations can be expressed by one of:

- "$_nC_3 = n(n-1)(n-2)/6$" when three types are selected from "n" different types of light and dark inks to form three dots corresponding to the respective types;
- "$_nC_1 \ast {}_{n-1}C_1 = (n-1)$" when two dots are formed by one selected from "n" different types of light and dark inks and one dot is formed by one selected from "n-1" different types thereof; and
- "$_nC_1 = n$" when three dots are formed by one selected from "n" different types of light and dark inks.

Accordingly, the number of light and dark combinations increases as the number of dots required for the formation of one pixel increases and/or the number of types of light and dark inks.

However, as described above, the number of dots to be discharged on one pixel is limited, so that the number of light and dark combinations is also limited.

In the present invention, therefore, image data is divided into an achromatic region and a chromatic region. For the achromatic region, the number of dots for black to be discharged on one pixel is increased to extend the range of selecting light and dark combinations for black. For the chromatic region, on the other hand, the number of dots for black to be discharged on one pixel is less than that of the achromatic region so as to sufficiently adapt to chromatic printing and resolve the problems such as ink leakage.

If the number of dots to be discharged on one pixel for black is "p" at the maximum in the achromatic region and "q" (t≧p>q) except around the maximum in the chromatic region, the light and dark combinations can be chosen in the ranges of those dot numbers. Therefore, a multi-valued number "$m_k$" at the achromatic region becomes larger than a multi-valued number "$m_c$" at the chromatic region (i.e., $m_k > m_c$).

In terms of forming dots in a way that is not granular to the user, it is preferable to make the multi-valued number "$m_k$" at least 10 or more. In this case, a resolution of the image may be also related.

An ink that forms the achromatic region is black or its derivatives, so that there is less over-striking of cyan, magenta, and yellow color ink dots on the same place. In the achromatic region, therefore, more levels of gray-scale for representing an image are attained by increasing the number of discharges of black ink per one pixel. It means that an image output is produced with a particular emphasis on its gray scale. On the other hand, inks that form the chromatic region not only include black but also considerable amounts of cyan, magenta, and yellow colors. Thus, the black ink should be discharged on one pixel so as to provide an allowance for placing other color inks. In order to provide the allowance, the number of ink discharges for black per one pixel of chromatic region is reduced than that of achromatic region, thereby reducing the number of levels of grayscale. However, the applying volume of black ink per one pixel of chromatic region can be reduced than that of the achromatic region. It becomes possible to discharge the sufficient amount of any of C, M, and Y colors over a dot of black formed on a printing medium, resulting in an image output with a particular emphasis on a color reproduction. In this matter, it becomes possible to provide a color reproduction with a sufficient gradation of black. That is, it can be attained by the steps of: dividing a given piece of image data into an achromatic region and a chromatic region; and changing the number of dots of black ink to be discharged with respect to each of these regions. However, the present invention is not restricted by such methods. It is also possible to use one of the other conventional methods well known in the art.

Next, we are now describing several methods for determining the achromatic region. The methods include one using RGB signals, two color-difference signals of color pictorial signals, color coordinate values obtained at the time of converting into the coordinates of uniform color space, or the like. In the present invention, however, it is not limited to those methods. It is also possible to use well-known other methods.

Each of those methods will be described below.

A concrete procedure for using each of 8-bit RGB signals (i.e., 8-bit signals of Red (R), Green (G), and Blue (B)) defines an achromatic region and a chromatic region using a difference between maximum and minimum values of the RGB, i.e., MAX. (R, G, B)–MIN. (R, G, B). If the difference is equal to or under the predetermined value, it is defined as an achromatic region. If the difference is over the predetermined value, it is defined as a chromatic region. The prescribed value is appropriately determined so as to fit to a type of an input image and its image characteristics, and an ink concentration of each of colors to be used. In this embodiment, the prescribed value is "10".

Further, strictly speaking, in accordance with the method of utilizing RGB signals per se, color information is not accurately reflected, but it is possible to evaluate a color approximately. This method is advantageous from the standpoint of simplification of the circuit for determining an achromatic region.

As a specific approach to convert input signals into respective colors of C, M, and Y, or alternatively C, M, Y, and K and utilize three values for C, M, and Y therefrom is as described below. That is, An achromatic region is identified if a value represented by MAX (C, M, Y)−MIN (C, M, Y) is equal to or less than the preset value, while a chromatic region is identified if a value represented by MAX (C, M, Y)−MIN (C, M, Y) is greater than the preset value, in the same manner used with the RGB signals. The preset value is not limited to any specific value in particular, and may be appropriately set depending upon an input image type, image characteristics, and further, ink concentrations of respective colors to be used. According to the present embodiment, an achromatic region is identified if a value is equal to or less than 10.

In the above two methods, furthermore, there is no need to confine a threshold value for making an assessment of the predetermined value, i.e., MAX (RorC, GorM, BorY)−MIN (RorC, GorM, BorY). In this case, preferably, one measure of the threshold value may be within the confines of 1% to 10% of the value that is possibly taken by RGB or CMY. If the threshold value is substantially larger than such confines, an area of the achromatic region is extended and then an ink overflow can be caused when another color ink is printed thereon. If it is substantially lower than such confines, depending on the images, an image output with emphasis on maximizing the graduation cannot be attained as a result of poor recognition of the achromatic region.

The method using color pictorial signals comprises the steps of: determining two color-difference signals R−Y' and B−Y' and then performing mathematical calculations on those signals to obtain a calculated value of $((R-Y')^2+(B-Y')^2)^{1/2}$. If the calculated value is equal to or lower than a prescribed value, it is defined as an achromatic region. If it is higher than the prescribed value, it is defined as a chromatic region. If the input image signals are RGB signals, these signals can be converted into color-difference signals. The conversion may be performed using a known converting equation such as the following equation (5). It is noted that variously corrected values may be also used.

$$\begin{bmatrix} Y' \\ R-Y' \\ B-Y' \end{bmatrix} = \begin{bmatrix} 0.30 & 0.59 & 0.11 \\ 0.50 & -0.42 & -0.08 \\ -0.17 & -0.33 & 0.50 \end{bmatrix} \begin{bmatrix} R \\ G \\ B \end{bmatrix} \quad (5)$$

The method using color coordinate values obtained at the time of converting into the coordinates of uniform color space, CIRLAB color space and CIELUV color space may be applied as uniform color space. In the uniform color space, all colors are represented in three-dimensional rectangular coordinates and also $a^*$, $b^*$ and $u^*$, $V^*$ represents hue and chroma as color coordinates. In this case, a visual color difference is substantially coincident with a numerical difference, so that it is effective to distinguish an achromatic region or not. In a concretive manner, if $(a^*)^2+(b^*)^2$ or $(u^*)^2+(v^*)^2$ is within the prescribed value, it is defined as an achromatic region. If $(a^*)^2+(b^*)^2$ or $(u^*)^2+(v^*)^2$ is greater than the prescribed value, it is defined as a chromatic region.

A multi-level processing to be used in the present invention is an error scattering method but not limited to. In the multi-level processing procedure for black, the number of the multi-level processing of the achromatic region is different from that of the chromatic region in the same image. Thus, the error scattering method is preferable because of allowing the change in the number of the multi-levels during the process. It is also possible to use a multi-level dither or the like to independently perform the multi-level processing on two different regions. Extreme caution must be taken to an image quality because it is easily declined at a boundary between these two values.

An inkjet printing method used in the present invention can be applied any of conventional inkjet printing systems in which ink droplets are discharged from nozzles using one of various driving mechanisms to perform printing. A representative example thereof is a method disclosed in Japanese Patent Application Laying-open No. 54-59936 (1979). In this method, ink can be discharged from nozzles by exerting a force on ink as a result of a change of state, i.e., sudden volume changes in ink by the action of thermal energies.

[First Embodiment]

A printing apparatus for forming a color echogram with 8 bits each of RGB is constructed as follows. In this embodiment, a black is provided using six different types of light and dark inks, each of cyan and magenta is provided using two different types of light and dark inks, and a yellow is provided using one type of ink. As an embodiment, in this embodiment, we will describe the apparatus where the number of ink-discharges (the number of dots) per one pixel is roughly limited to 5. A printing medium used in this embodiment is a high-gloss film having an ink-receiving layer.

FIG. 1 is a block diagram of an image-processing portion of a printing apparatus in accordance with the present invention. The image-processing portion comprises a pre-processing unit 1, a masking processing unit 2, a UCR processing unit 3, a post-processing unit 4, an achromatic region determining unit 5, gray-scaled combination table 6 that stores combinations of ink types and concentrations, a multi-level processing unit 7, a discharge data producing unit 8, and a driver 9.

When the image-processing portion receives data of an image as RGB signals, the pre-processing unit 1 performs several processes including: an input-gamma correction in consideration of gamma-characteristics of a monitor; and a LOG-converting processing for fitting the input signals to a human-perceivable brightness. In addition, conversion from RGB to CMY is also performed. The image data processed by such a way in the pre-processing unit 1 is then subjected to the process for correcting an irregular absorption of each color and so on in the masking processing unit 2. Then, an under color removal (UCR) is performed in the UCR processing unit 3. The degree of UCR is not limited to a certain condition. It can be varied with reference to the input level. In terms of a drop in the amount of ink to be used, it is preferable to perform the UCR processing at frequent intervals. In this example, the UCR processing unit 3 replaces the minimum value of each of CMY elements entirely with black (K). After the above sequential processes, the post-processing unit 4 performs an output-gamma correction and the like in consideration of the amount of dot-gain at the time of actual printing.

Aside from the image-processing described above, the achromatic region determining unit 5 receives image data and then it determines an achromatic region of the input image data. In the present example, the input RGB signals are directly used. A discriminant (6) for the determination is the following expression.

$$\text{MAXC}(R, G, B) - \text{MIN}(R, G, B) \leq 10 \quad (6)$$

A region that satisfies the discriminant is defined as an achromatic region. Then, the multi-level processing unit 7 receives data that divides the image data into a chromatic region and an achromatic region.

By the way, the value "10" is determined with consideration given to the following facts. That is, the input data is a color echogram. A black (K) to be used is provided using six different types of light and dark inks, each of cyan and magenta is provided using two different types of light and dark inks, and a yellow is provided using one type of ink. In addition, the number of ink-discharges (the number of dots) per one pixel is roughly limited to 5. Furthermore, this size corresponds to about 4% of the possible values of 0 to 255 for RGB.

Gray-scaled combination tables shown in FIG. 2 to FIG. 4 store information that concerns inks to be used, concentrations of inks at the time of printing, and so on. In this example, information that concerns usage combinations of gray-scaled inks of the respective CMY and their concentrations, and information that concerns usage combinations of gray-scaled inks of black for an achromatic region and a chromatic region. There are five types in total for CMY, six types for black-derived color, and gray-scaled inks are indicated by numerical sbscripts: 1, 2, 3, . . . in decreasing order of concentration. Table 1 shows the ratio of ink-dye concentrations. In this case, the ink consists of a dye and a solvent. The solvent includes various kinds of additives such as a surfactant and a humectant. These additives are responsible for controlling the discharge characteristics of a printing head and the absorbing characteristics of an image-receiving medium.

TABLE 1

Dye concentration ratios and reflection densities of various kinds of inks

| | Ink types | | | | |
| --- | --- | --- | --- | --- | --- |
| | C1 | C2 | M1 | M2 | Y |
| Dye-concentration ratio (%) | 3.5 | 0.9 | 3.5 | 0.9 | 2.5 |
| Reflection density (O.D.) | 1.88 | 0.51 | 1.58 | 0.59 | 1.75 |

| | Ink types | | | | | |
| --- | --- | --- | --- | --- | --- | --- |
| | K1 | K2 | K3 | K4 | K5 | K6 |
| Dye-concentration ratio (%) | 4.8 | 2.4 | 1.2 | 0.6 | 0.3 | 0.15 |
| Reflection density (O.D.) | 1.67 | 0.96 | 0.51 | 0.27 | 0.13 | 0.07 |

Using those inks, one pixel is formed by two dots at the maximum for each of C, M, and Y colors. Regarding a black-derived color, one pixel is formed by four dots at the maximum for an achromatic region while one pixel formed by one dots in principle for a chromatic region. The results obtained by the process using such a limitation of the number of dots are shown in FIG. 2. In the figure, each of numeric characters indicates the number of ink dots to be discharged on one pixel. Thus, "0 (zero)" denotes that any ink drop is not discharged.

In FIG. 2, boxes for gray-scale levels represent values corresponding to 8-bit input image signals (0 to 255: "0" denotes black). For C and Y, therefore, a multi-level processing of 5 values is performed. For Y, a multi-level processing of 3 values is performed. For K, a multi-level processing of 43 values is performed on an achromatic region and 9 values on a chromatic region.

Then, the multi-level processing unit 7 performs an error diffusion processing on the basis of the above data. In regard to the black, the processing is performed using the results in the achromatic region determining unit 5. For the achromatic region, the multi-level processing of 43 values is performed with reference to the gray-scale levels (d1[0] to d1[42]) of FIG. 3 and multiplexing threshold values (th[1] to th[42]). For the chromatic region, on the other hand, the multi-level processing of 9 values is performed with reference to the gray-scale levels (d1[0] to d1[8]) of FIG. 4 and multiplexing threshold values (th[1] to th[8]).

For example, if an input value is a gray-scale level of "10" in the achromatic region, then the threshold values can be represented by the following expression with reference to FIG. 3.

$$Th[1]10<th[2]$$

Thus, X=1 is obtained. Thus, a gray-scale level of this image is determined by the following equation.

$$d[1]=14$$

Thus, an error of 4(=14−10) is obtained.

The error thus obtained is diffused to peripheral pixels by means of well-known error diffusion method.

The image data processed by the above multi-level processing is referenced to data listed in a gray-scale combination table at the discharge data generating unit 8, resulting in discharge data for various kinds of inks. That is, the discharge data generating unit 8 determines the type of ink and the number of dots to be discharged with respect to the predetermined pixel. Then, parameters such as the number of printing passes are adjusted to define various driving conditions including a discharge-timing of each nozzle and the feed ratio of the printing medium. Consequently, an output of image can be actually attained.

In this example, an output of image is performed using four inkjet heads (256 nozzles×three multi-heads; the discharging volume is 9 pl) corresponding to 600 dpi. As a result, a gray-scale image with excellent monochrome and color portions is obtained.

Comparative Example 1

A color echogram with 8 bits each of RGB is prepared by the same way as that of the first embodiment. Thus, a black is provided using six different types of light and dark inks, each of cyan and magenta is provided using two different types of light and dark inks, and a yellow color is provided using one type of ink. Then, the color echogram is printed on a printing medium by the same way as that of the first embodiment. In this comparative example, however, a discriminant (6) is provided as a criteria for an assessment at the achromatic region determining unit 5 in FIG. 1, which is different from that of the first embodiment.

$$MAX(R, G, B)-MIN(R, G, B) \leq 50 \qquad (6)$$

By the way, the value "50" corresponds to about 20% of the possible values for RGB. Therefore, an achromatic region occupies about 86% in the whole image. In the first embodiment, on the other hand, it is about 79%.

After determining the achromatic region by the process described above, we obtain a color image by various steps including a multi-level processing just as in the case with the first embodiment. In this case, however, an undesirable ink-overflow is caused in a part of the image.

Comparative Example 2

A color echogram with 8 bits each of RGB is prepared by the same way as that of the first embodiment. In this comparative example, however, a discriminant (7) is provided as a criteria for an assessment at the achromatic region determining unit 5 in FIG. 1, which is different from that of the first embodiment.

$$MAX(R, G, B) - MIN(R, G, B) \leq 2 \qquad (7)$$

By the way, the value "2" corresponds to about 0.8% of the possible values for RGB. Therefore, an achromatic region occupies only about 7% in the whole image.

After determining the achromatic region by the process described above, we obtain a color image by various steps including a multi-level processing just as in the case with the first embodiment. An undesirable ink-overflow is not generated. In this case, however, there is a portion where ink dots are recognized as the difference of concentrations at the achromatic region (gray portion) with a particular emphasis on the gray-scale.

[Second Embodiment]

In this embodiment, we will describe a method for determining an achromatic region through the use of C, M, and Y signals in detail.

Figure 5:
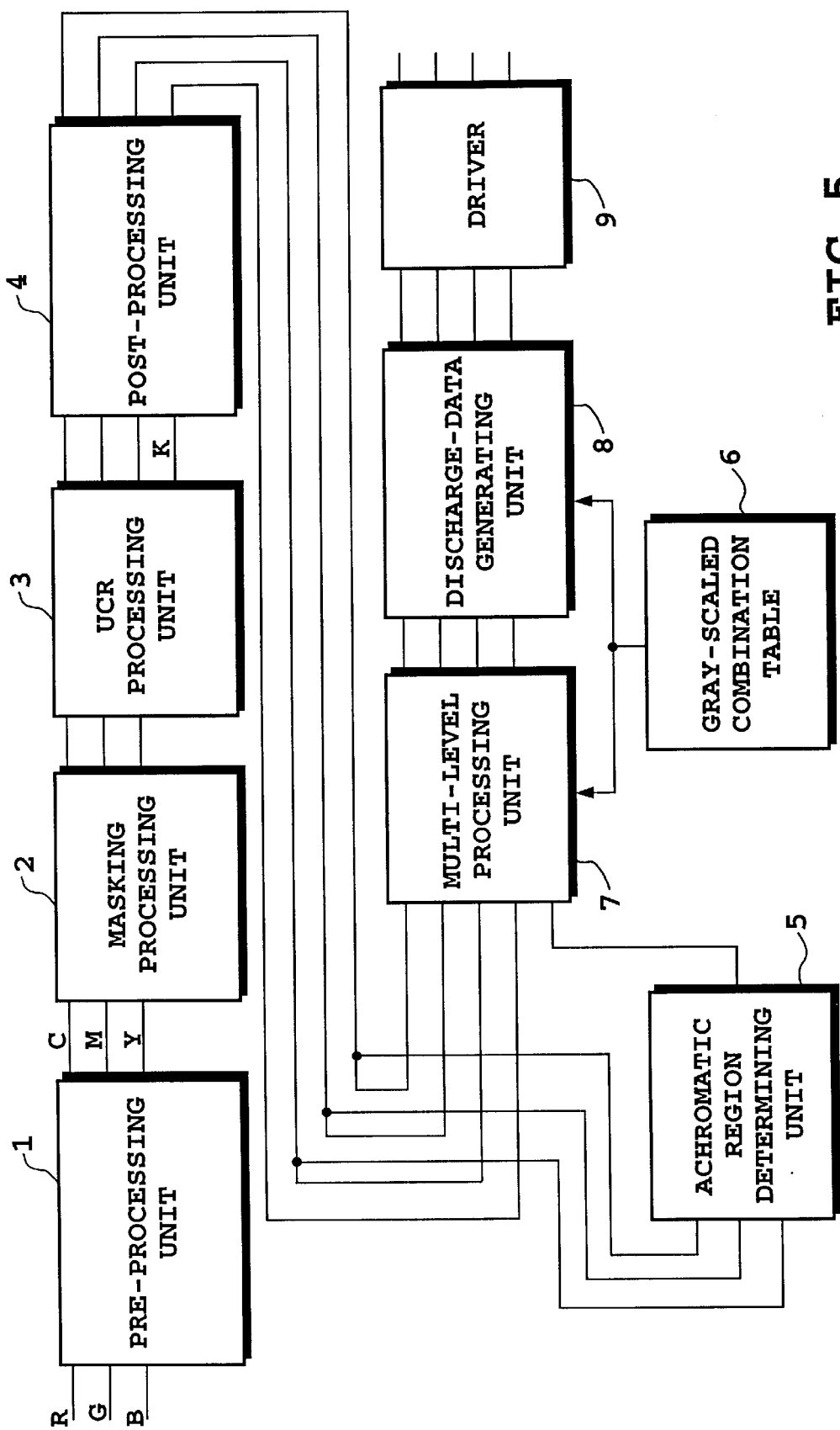
FIG. 5 is a block diagram of an image processing procedure in a second embodiment of the present invention.

A color echogram with 8 bits each of RGB is prepared by the same way as that of the first embodiment. Thus, a black is provided using six different types of light and dark inks, each of cyan and magenta is provided using two different types of light and dark inks, and a yellow color is provided using one type of ink. Then, the color echogram is printed on a printing medium by the same way as that of the first embodiment. A block diagram of an image processing in accordance with the present embodiment is illustrated in FIG. 5.

The present embodiment provides the method for determining the achromatic region, which is different from that of the first embodiment. As shown in FIG. 5, the achromatic region is determined using CMY signals after performing various processes including masking, UCR, and output gamma-correction. In this embodiment, a discriminant (8) is provided as a criteria for an assessment at the achromatic region determining unit 5.

$$MAX(C, M, Y) - MIN(C, M, Y) \leq 15 \qquad (8)$$

By the way, the value "15" corresponds to about 6% of the possible values of 0 to 255 for CMY.

In this example, an output of image is performed using four inkjet heads (256 nozzles×three multi-heads; the discharging volume is 8.5 pl) corresponding to 600 dpi. As a result, a gray-scale image with excellent monochrome and color portions is obtained.

[Third Embodiment]

We will describe the embodiment where an input signal is a video signal.

A color echogram is provided by input of video signals. Then, an output of the color echogram is printed on a reflective medium through the use of the following color inks. That is, a black is provided using three different types of light and dark inks, and also each of C, M, and Y is provided using one type of ink. The number of ink-discharges (the number of dots) per one pixel is roughly limited to 4 with respect to inks and the reflective medium used in the present embodiment.

Figure 6:
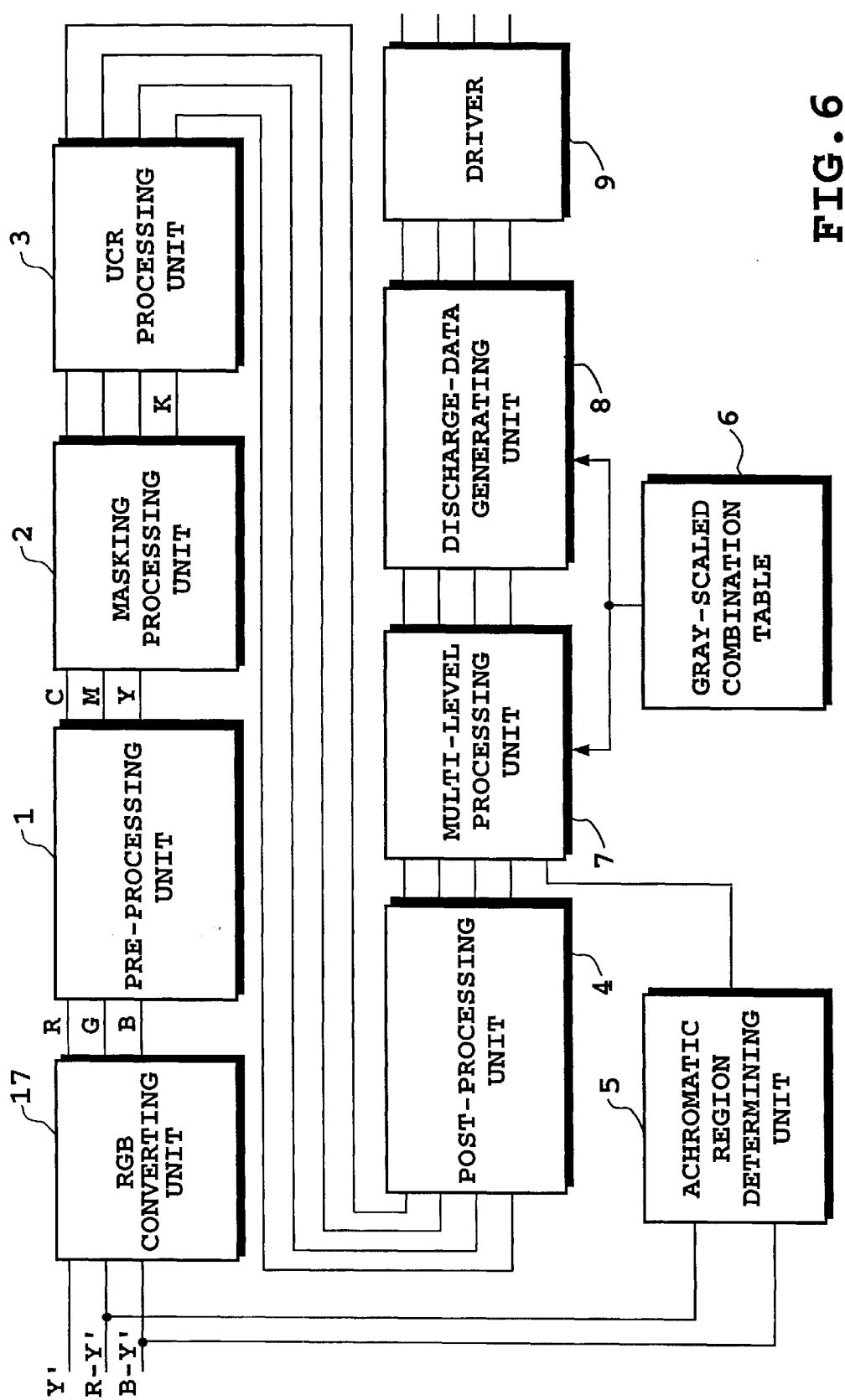
FIG. 6 is a block diagram of an image processing procedure in a third embodiment of the present invention.

A block diagram of an image processing in accordance with the present embodiment is illustrated in FIG. 6. An input video signal entered into the achromatic region determining unit 5 that determines whether the achromatic region or not. In this embodiment, a discriminant (9) is provided as criteria for an assessment.

$$((R-Y)^2 + (B-Y)^2)^{1/2} \leq 6 \qquad (9)$$

Consequently, the achromatic region is determined and then the input image signals are converted into RGB signals at the RGB converting portion 10, followed by various processes including gamma-correction, masking, and UCR as just in the case of the first embodiment. Then, the resulting signals are entered into the multi-level processing unit 7.

A gray-scaled combination table 6 stores information that concerns usage combinations of gray-scaled inks of the respective CMY and their concentrations, and information that concerns usage combinations of gray-scaled inks of black for an achromatic region and a chromatic region. Table 2 shows the ratio of ink-dye concentrations of the respective CMY colors.

TABLE 2

Dye concentration ratios and reflection densities of various kinds of inks

| | Ink types | | | | | |
|---|---|---|---|---|---|---|
| | C | M | Y | K1 | K2 | K3 |
| Dye-concentration ratio (%) | 2.5 | 2.5 | 1.8 | 3.2 | 1.2 | 0.4 |
| Reflection density (O.D.) | 1.80 | 1.55 | 1.71 | 1.61 | 0.71 | 0.25 |

Using those inks, one pixel is formed by two dots at the maximum for each of C, M, and Y colors. In regard to a black (K), one pixel is formed by three dots at the maximum for an achromatic region while one pixel formed by one dots in principle for a chromatic region. The results are shown in FIGS. 7, 8, and 9. For C, M, and Y, therefore, a multi-level processing of 3 values is performed. For K, a multi-level processing of 18 values is performed on an achromatic region and 6 values on a chromatic region.

As in the same way as that of the first embodiment, an output of image is performed using two inkjet heads (256 nozzles×three multi-heads; the discharging volume is 12 pl) corresponding to 600 dpi. As a result, a gray-scale image with excellent monochrome and color portions is obtained.

[Fourth Embodiment]

A color echogram with 8 bits each of RGB is prepared by the same way as that of the first embodiment. Thus, a black is provided using six different types of light and dark inks, each of C and M is provided using two different types of light and dark inks, and a yellow color is provided using one type of ink. Then, the color echogram is printed on a printing medium by the same way as that of the first embodiment.

Figure 10:
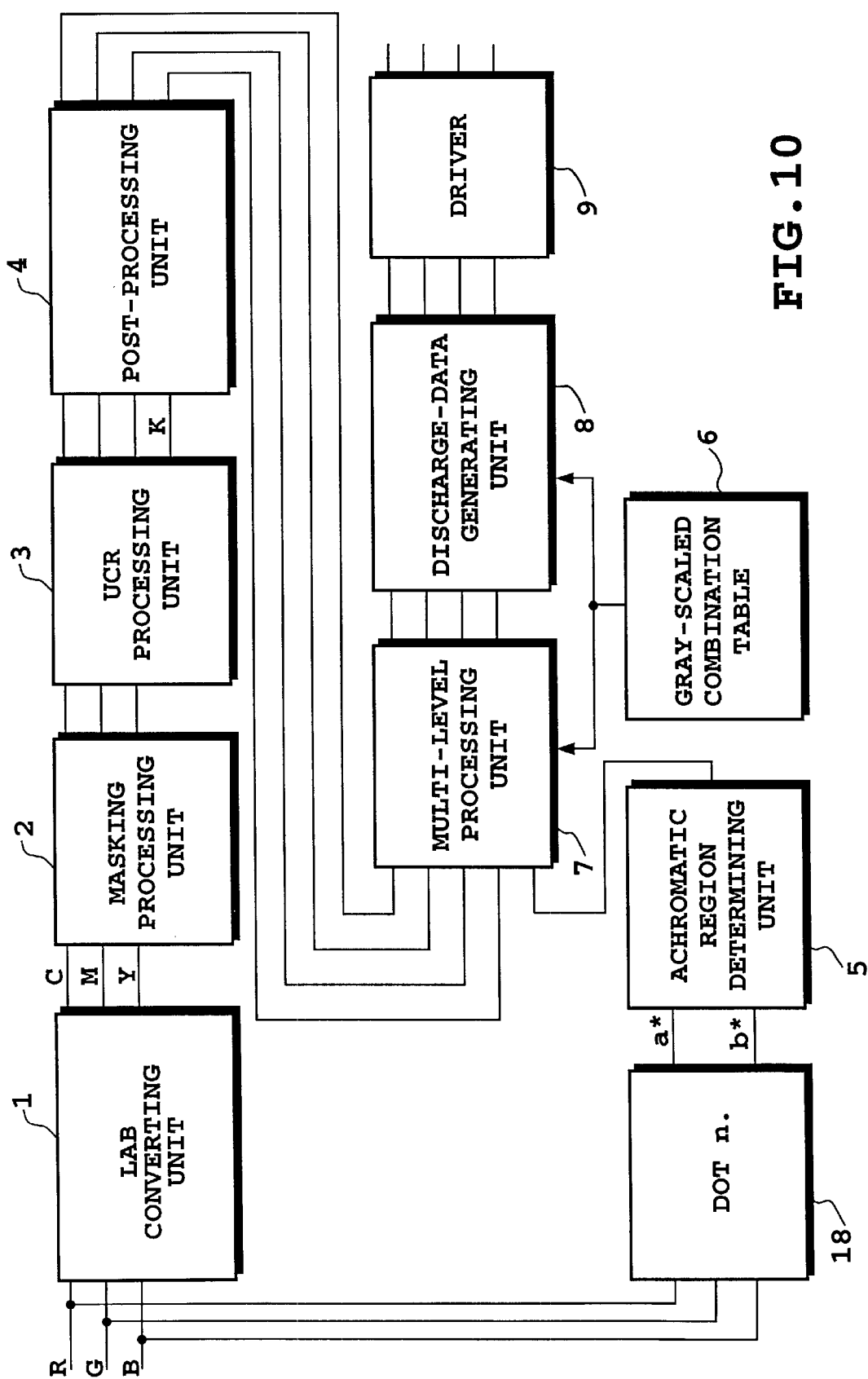
FIG. 10 is a block diagram of an image processing procedure in a fourth embodiment of the present invention.

A block diagram of an image processing in accordance with the present embodiment is illustrated in FIG. 10. Input RGB singnals are converted from RGB to L*a*b* signals at the Lab converting unit 11 and then entered into the achromatic region determining unit 5 that determines whether the achromatic region or not. In this embodiment, a discriminant (10) is provided as criteria for an assessment.

$$((a^*)^2 + (b^*)^2)^{1/2} \leq 8 \qquad (10)$$

Consequently, the achromatic region is determined, followed by various processes including gamma-correction, masking, and UCR as just in the case of the first embodiment. Then, the resulting signals are entered into the multi-level processing unit 7. In the multi-level processing unit 7, the multi-level processing is performed with reference to the results of the determination whether the achromatic region or not. For C and M, therefore, a multi-level processing of 5 values is performed. For Y, a multi-level processing of 3 values is performed. For K, a multi-level processing of 43 values is performed on an achromatic region and 9 values on a chromatic region.

Using such results, an output of image is performed using four inkjet heads (256 nozzles×three multi-heads; the discharging volume is 9 pl) corresponding to 600 dpi. As a result, a gray-scale image with excellent monochrome and color portions is obtained.

By the way, the present embodiment adjusts a predetermined threshold, divides image data into an achromatic region and a chromatic region on the basis of such a threshold, and restricts the umber of black dots to be discharged. However, it is not limited to such a procedure but also possible to provide another procedure in which the number of black printable dots depending on chroma of the image data instead of dividing the image data into two regions of achromatic and chromatic.

In any of those embodiments, an inkjet printing apparatus is described. Using the printing apparatus and the printing method of the present invention, the generations of cockling and ink-overflow can be avoided. Also, an image quality can be improved by controlling the discharging volume of black with reference to the results of discriminating the achromatic region and the chromatic region. Therefore, the present invention is not restricted by the inkjet system. It almost seems superfluous to say that the other printing systems such as a thermal transfer system and a thermal system can be also used in the present invention.

As described above, the printing apparatus and the printing method allow that input image data is divided into an achromatic region and a chromatic region. In the achromatic region, we increase the number of black dots to be discharged. In the chromatic region, on the other hand, C, M, and Y color inks can be printed over black. Therefore, a color image can be obtained with satisfaction of color reproduction in addition to satisfaction of black gradation. It means that a high-quality image that requires an excellent black gradation and an excellent coloring, such as a color echogram can be satisfactory reproduced.

The present invention achieves distinct effect when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 59-123670 (1984) and 59-138461 (1984) in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consists of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. Examples of the recovery system are a capping means and a cleaning means for the recording head, and a pressure or suction means for the recording head. Examples of the preliminary auxiliary system are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 54-56847 (1979) or 60-71260 (1985). The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A printing apparatus that forms an image with use of a plurality of types of black ink having different concentrations and other color inks, comprising:
    region-determining means for determining whether a color represented by image data belongs to an achromatic region or a chromatic region on the basis of the image data; and
    gray-scale combination means for determining the type of ink and a volume of ink to be applied to one pixel on the basis of the image data for each region determined by said region-determining means.

2. A printing apparatus as claimed in claim 1, wherein said gray-scale combination means makes at least one of the number of the types of black ink or a volume of the black ink to be applied to one pixel in the achromatic region greater than that in the chromatic region.

3. A printing apparatus as claimed in claim 1, wherein the volume of ink to be applied corresponds to the number of multi-levels of the image data.

4. A printing apparatus as claimed in claim 1, wherein said region-determining means determines that the color belongs to the achromatic region when a difference between a maximum value and a minimum value among R, G and B values shown by the image data for each pixel is less than or equal to a predetermined value.

5. A printing apparatus as claimed in claim 4, wherein said region-determining means determines that the color belongs to the achromatic region when a difference between a maximum value and a minimum value among R, G and B values corresponds to 1% to 10% of a range of values that R, G and B values are obtainable.

6. A printing apparatus as claimed in claim 1, wherein said region-determining means determines that the color belongs to the achromatic region when a difference between a maximum value and a minimum value among C, M and Y values shown by the image data for each pixel is less than or equal to a predetermined value.

7. A printing apparatus as claimed in claim 6, wherein said region-determining means determines that the color belongs to the achromatic region when a difference between a maximum value and a minimum value among C, M and Y values corresponds to 1% to 10% of a range of values that C, M and Y values are obtainable.

8. A printing apparatus as claimed in claim 1, wherein said region-determining means determines that the color belongs to the achromatic region when a calculated value corresponds to a predetermined value or less, where the calculated value is obtained by calculating $$((R-Y')2+(B-Y')2)^{1/2}$$

wherein Y' denotes a luminance signal for each pixel of the image data to be reproduced, R–Y' denotes a color-difference signal, and B–Y' denotes another color-difference signal.

9. A printing apparatus as claimed in claim 8, wherein said region-determining means determines that the color belongs to the achromatic region when the calculated value of $((R-Y')2+(B-Y')2)^{1/2}$ is 6 or less.

10. A printing apparatus as claimed in claim 1, further comprising:
    a printing head for applying two or more black-derived color inks having different concentrations and at least one of other color inks, wherein said printing head generates an air bubble in ink through the use of thermal energies and discharges ink by a pressure caused by generation of the air bubble.

11. A printing apparatus as claimed in claim 1, wherein said gray-scale combination means determines the type of ink and a volume of ink to be applied to one pixel using a different table on the basis of each region,
    the other color inks include a plurality of types of ink having different concentrations, and
    the achromatic region is the region represented by the gray-scale ink of the black-type, whereas,
    the chromatic region is the region represented by an ink containing at least one color of Y, M and C.

12. A printing apparatus that forms an image with use of a plurality of types of black ink having different concentrations and other color inks, comprising:
    region-determining means for determining whether a color represented by image data belongs to an achromatic region or a chromatic region on the basis of the image data; and
    means for changing a number of multi-level values for multi-level processing performed on the image data in accordance with a region determined by said region-determining means.

13. A printing method using a printing apparatus that forms an image with use of a plurality of types of black ink having different concentrations and other color inks, comprising the steps of:
    region-determination for determining whether a color represented by image data belongs to an achromatic region or a chromatic region on the basis of the image data; and gray-scale combining for determining the type of ink and a volume of ink to be applied to one pixel on the basis of the image data for each region determined in said region-determination step.

14. A printing method as claimed in claim 13, wherein said gray-scale combining step makes at least one of the number of the types of black ink or a volume of the black ink to be applied to one pixel in the achromatic region greater than that in the chromatic region.

15. A printing method as claimed in claim 13, wherein
the volume of ink to be applied corresponds to the number of multi-levels of the image data.

16. A printing method as claimed in claim 13, wherein said region-determination step determines that the color belongs to the achromatic region when a difference between a maximum value and a minimum value among R, G and B values shown by the image data for each pixel is less than or equal to a predetermined value.

17. A printing method as claimed in claim 16, wherein said region-determining step determines that the color belongs to the achromatic region when a difference between a maximum and a minimum values among R, G and B values corresponds to 1% to 10% of a range of values that the R, G and B values are obtainable.

18. A printing method as claimed in claim 13, wherein said region-determining step determines that the color belongs to the achromatic region when a difference between a maximum value and a minimum value among C, M and Y values shown by the image data for each pixel is less than or equal to a predetermined value.

19. A printing method as claimed in claim 18, wherein said region-determining step determines that the color belongs to the achromatic region when a difference between a maximum value and a minimum value among C, M and Y values corresponds to 1% to 10% of a range of values that C, M and Y values are obtainable.

20. A printing method as claimed in claim 13, wherein said region-determining step determines that the color belongs to the achromatic region when a calculated value corresponds to a predetermined value or less, where the calculated value is obtained by calculating $$((R-Y')2+(B-Y')2)^{\frac{1}{2}}$$

wherein Y' denotes a luminance signal for each pixel of the image data to be reproduced, R–Y' denotes a color-difference signal, and B–Y' denotes another color-difference signal.

21. A printing method as claimed in claim 20, wherein said region-determining means determines that the color belongs to the achromatic region when the calculated value of $((R-Y')2+(B-Y')2)^{\frac{1}{2}}$ is 6 or less.

22. A printing method as claimed in claim 13, wherein said gray-scale combining step determines the type of ink and a volume of ink to be applied to one pixel using a different table on the basis of each region, the other color inks include a plurality of types of ink having different concentrations, and the achromatic region is the region represented by the gray-scale ink of the black-type, whereas, the chromatic region is the region represented by an ink containing at least one color of Y, M and C.

23. A printing method using a printing apparatus that forms an image with use of a plurality of types of black ink having different concentrations and other color inks, comprising the step of:

choosing one combination of a type of ink and a volume of ink to be applied on one pixel from combinations of the type of ink and the volume of ink, a number of which differs between achromatic colors and chromatic colors represented by image data.

24. A printing method using a printing apparatus that forms an image with use of a plurality of types of black ink having different concentrations and other color inks, comprising the steps of:

region-determination for determining whether a color represented by image data belongs to an achromatic region or a chromatic region on the basis of the image data; and changing a number of multi-level values for multi-level processing performed on the image data in accordance with a region determined in said region-determination step.

* * * * *

UNITED STATES PATENT AND TRADEMARK OFFICE
CERTIFICATE OF CORRECTION

PATENT NO. : 6,540,328 B1
DATED : April 1, 2003
INVENTOR(S) : Masataka Yashima et al.

It is certified that error appears in the above-identified patent and that said Letters Patent is hereby corrected as shown below:

<u>Title page,</u>
Item [65], insert:
-- [65] Prior Publication Data
    US 2003/0052942 A1 Mar. 20, 2003 --.

<u>Column 1,</u>
Line 14, "inks" should read -- ink --.

<u>Column 2,</u>
Line 38, "the" should be deleted; and
Line 63, "SPETIAL" should read -- SPATIAL --.

<u>Column 8,</u>
Line 8, "applied" should read -- applied to --.

<u>Column 9,</u>
Line 53, "dots" should read -- dot --.

<u>Column 12,</u>
Line 35, "dots" should read -- dot --.

<u>Column 13,</u>
Line 44, "satisfactory" should read -- satisfactorily --.

<u>Column 16,</u>
Lines 21 and 29, "$((R - Y')2 + (B - Y')2)^{1/2}$" should read
-- $((R - Y')^2 + (B - Y')^2)^{1/2}$ --.

<u>Column 17,</u>
Line 42, "$((R - Y')2 + (B - Y')2)^{1/2}$" should read
-- $((R - Y')^2 + (B - Y')^2)^{1/2}$ --.

UNITED STATES PATENT AND TRADEMARK OFFICE
CERTIFICATE OF CORRECTION

PATENT NO.   : 6,540,328 B1
DATED        : April 1, 2003
INVENTOR(S)  : Masataka Yashima et al.

It is certified that error appears in the above-identified patent and that said Letters Patent is hereby corrected as shown below:

<u>Column 18,</u>
Line 8, "$((R - Y')2 + (B - Y')2)^{1/2}$" should read
-- $((R - Y')^2 + (B - Y')^2)^{1/2}$ --.

Signed and Sealed this

Tenth Day of February, 2004

JON W. DUDAS
*Acting Director of the United States Patent and Trademark Office*